US005646951A

United States Patent [19]

Fischer et al.

[11] Patent Number: 5,646,951

[45] Date of Patent: Jul. 8, 1997

[54] METHOD AND APPARATUS FOR LINEWIDTH NARROWING AND SINGLE MODE OPERATION IN LASERS BY INTRA-CAVITY NONLINEAR WAVE MIXING

[75] Inventors: Baruch Fischer, Haifa; Ron Daisy, Tiberias; Moshe Horowitz, Haifa, all of Israel

[73] Assignee: Technion Research & Development Foundation Ltd., Haifa, Israel

[21] Appl. No.: 408,152

[22] Filed: Mar. 21, 1995

[30] Foreign Application Priority Data

Mar. 24, 1994 [IL] Israel .......................................... 109102

[51] Int. Cl.$^6$ .......................................... H01S 3/098

[52] U.S. Cl. .......................................... 372/19; 372/6; 372/11

[58] Field of Search .......................................... 372/6, 19, 11

[56] References Cited

U.S. PATENT DOCUMENTS

| | | | |
|---|---|---|---|
| 5,359,612 | 10/1994 | Dennis et al. | 372/6 |
| 5,436,925 | 7/1995 | Lin et al. | 372/6 |
| 5,448,579 | 9/1995 | Chang et al. | 372/6 |

*Primary Examiner*—Rodney B. Bovernick
*Assistant Examiner*—Robert E. Wise
*Attorney, Agent, or Firm*—Edward Langer

[57] ABSTRACT

A method of using a distributed saturable absorber added to a laser cavity, which by nonlinear wave-mixing of the counterpropagating beams (or spatial hole-burning) promotes a reduction of the linewidth and a single mode operation.

15 Claims, 7 Drawing Sheets

METHOD AND APPARATUS FOR LINEWIDTH NARROWING AND SINGLE MODE OPERATION IN LASERS BY INTRA-CAVITY NONLINEAR WAVE MIXING

FIELD OF THE INVENTION

The present invention relates to lasers, and more particularly, to a method for linewidth narrowing and single frequency operation of lasers, which are useful in many applications in image processing and communication.

BACKGROUND OF THE INVENTION

The prior aft of laser construction and operation has demonstrated that the coupling between the counter-propagating waves in laser amplifiers and the accompanying effects of spatial hole burning and cross saturation effects are causes for a degradation of lasers' oscillation quality, and a reduction in its power and coherence. These effects can best be observed in the following two ways: (a) The reflection from the induced saturable gain grating due to the interference pattern (the Bragg condition is automatically fulfilled) are found to be destructively interfering (phase difference of 180°) with the corresponding copropagating waves; thus providing a negative feedback, which in turn tends to eliminate this grating by a reduction of the coherence. (b) Alternatively, it can be verified that in most of the interesting cases, a uniform distribution of light intensity in saturable gain media, (corresponding to mutually incoherent counter-propagating beams) provides more amplification, compared to the nonuniform distribution of gain (as in a standing wave pattern) with the same intensity average, for the waves that create the pattern. In the high intensity sections, the saturation decreases the gain, while in the unsaturated places the gain is ineffective due to low or zero intensity. Therefore, more gain can be achieved for less coherent waves, as interference is reduced.

Moreover, this interference has an opposite effect on a third wave with a different frequency. Then, nonuniform periodic gain distribution due to the interference of the first pair provides more amplification for the signal compared to the uniform case, since the overlap between the intensity and the gain patterns (gratings) is higher. In the grating picture this corresponds to the situation where the Bragg condition is not met and the reflections are eliminated. This is a reason for the tendency to multi-longitudinal mode oscillation of lasers.

For many purposes, such as fiber optic communication, sensors, image processing, interferometry, and measurements, it would be desirable to improve the quality of laser oscillations and obtain single frequency operation.

SUMMARY OF THE INVENTION

Accordingly, it is a principal object of the present invention to provide a method for single frequency operation in lasers by use of a linewidth narrowing mechanism. The invention is based on nonlinear wave-mixing of the counter-propagating beams in the cavity.

In accordance with a preferred method of the invention, there is provided a method for single frequency operation and linewidth narrowing of lasers, said method comprising the steps of:

providing a laser cavity, having a gain medium, and a distributed saturable absorber; and pumping said gain medium to provide oscillation of at least one pair of counter-propagating light beams, such that said saturable absorber develops nonlinear wave-mixing of said at least one pair of counter-propagating light beams.

In accordance with the preferred method of the invention, a distributed saturable absorber is used in the laser cavity and causes a flip of the sign of the deteriorating factor of the wave-mixing, such that it will work in the right direction of improving the laser oscillation quality and reducing its linewidth. Then, the nonlinear wave- mixing effect is opposite to its role in the saturable gain case. Here, the reflections from the induced saturable absorbing grating are in-phase (compared to the 180° phase difference in the saturable gain case) and provide positive feedback.

Similarly, it can be shown that the absorption is lower when the light intensity has a nonuniform periodic distribution along the saturable absorber, compared to the uniform case. Therefore, interference and a standing wave pattern in the cavity, is favored. This leads to more coherence and single longitudinal mode operation. The effect oil a third signal wave with a different frequency is also opposite and the absorption is higher for the nonuniform gain distribution case, as shown below. Here, the third wave which is asynchronized or phase mismatched with the "ups" and "downs" of the periodic distribution of the saturable absorber, suffers more losses. This provides the tendency to eliminate other modes.

Saturable absorbers are also used in laser cavities for passive mode-locking purposes. In these applications, unlike with the present invention, the saturable absorber has a lumped saturation and fast response feature which drives the laser to operate in pulses, where the light energy bunching in the time axis lowers the losses.

Oscillation is obtained using an amplifying section in the cavity, but in order to reduce its deteriorating effect, the wave-mixing in it is eliminated. This can be done, for example, by proper arrangements in the cavity such that the polarizations of the counter-propagating beams in the gain section will be perpendicular (but parallel in the absorber).

Using the method of the invention, a demonstration was done with an erbium-doped fiber laser, and a linewidth in the few kHz region was obtained. The method of having the self-induced grating distributed in a long fiber gives another important dimension to the narrowing mechanism.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF A PREFERRED EMBODIMENT

Figure 1:
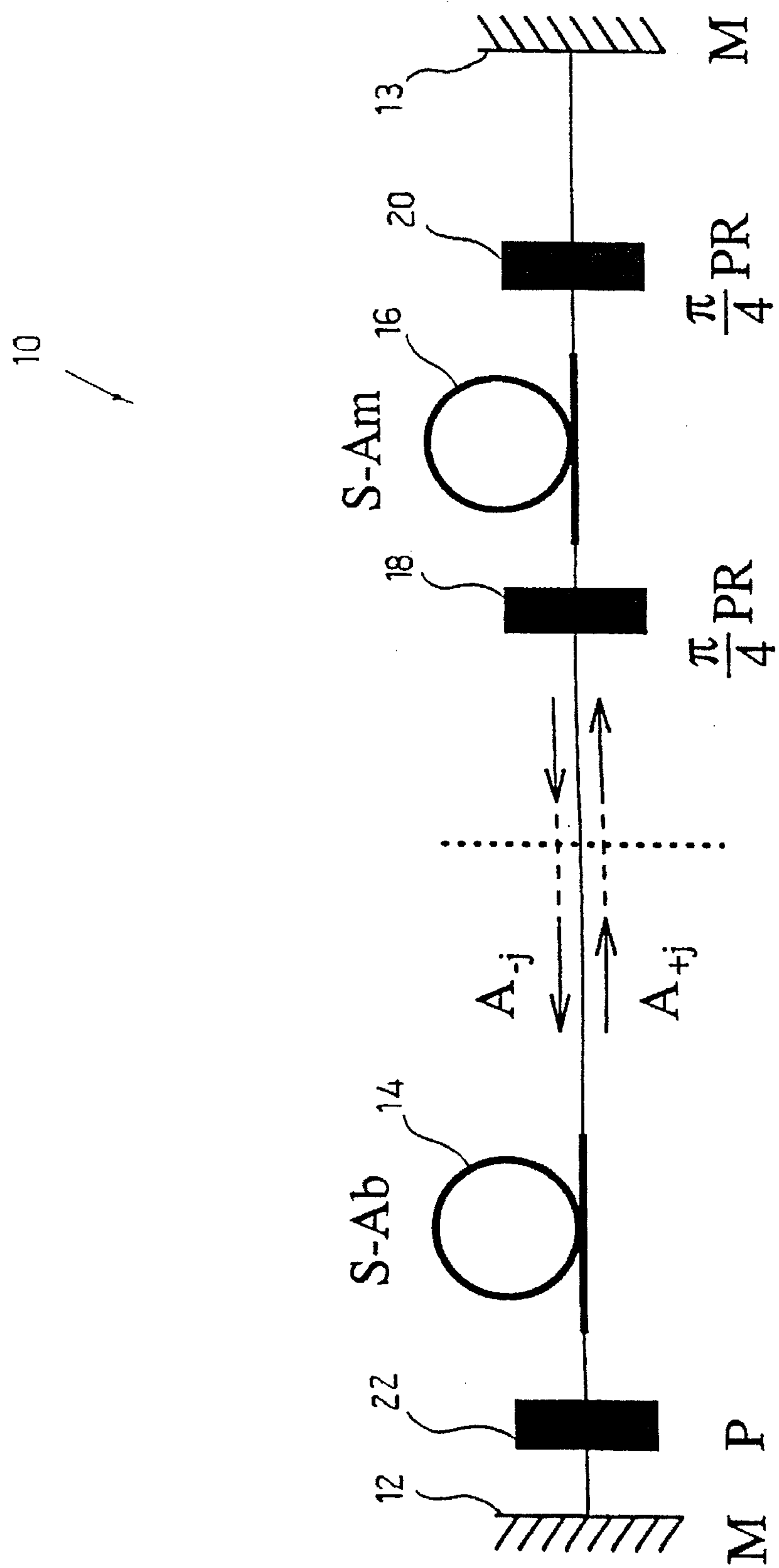
FIG. 1 is a schematic diagram of a laser system having a saturable absorber and saturable amplifier, constructed in accordance with the method of the present invention.

Referring now to FIG. 1, there is shown a schematic diagram of a preferred embodiment of a laser system 10 constructed and operated in accordance with the principles of the present invention. System 10 comprises a pair of mirrors, an output mirror 12 and a back mirror 13, together defining the laser cavity, in which a distributed saturable absorber 14 and amplifier 16 are placed. A pair of polarization rotator plates 18, 20 (such as ±45 degree Faraday rotators) are placed on either side of saturable amplifier 16, and a polarizer 22 is placed between mirror 12 and saturable absorber 14.

In accordance with the inventive method, distributed saturable absorber 14 is used, with wave mixing in it, to enhance bunching in the spatial (longitudinal) axis, affecting the frequency domain and driving the laser to narrow linewidths and more coherence. The saturable absorber 14 used in a demonstration in accordance with the method of the invention was an erbium- doped fiber, which cannot be simply used for passive mode-locking because of its long time response (~10 msec) compared to the cavity round trip time, and its distributed feature.

In the following description, there is presented a brief theoretical analysis of the laser system shown in FIG. 1, which has in the cavity saturable absorber 14 and saturable amplifier 16. The analysis is based on the work by G. P. Agrawal and M. Lax, J. Opt. Soc. Am. 71, 515 (1981), and J. Opt. Soc. Am., 60, 1717 (1979) and uses the intensity dependent susceptibility $\chi=\chi\mathbf{0}(1+i\Omega)/(1+\Omega^2+I/I_a)$ (two-level system assumption), which can be taken as a good approximation for the three level system of erbium-doped fibers, as described in the paper by E. Desurvire, IEEE J.Lightwave Tech. 8, 1517 (1990). However, other forms of susceptibility give similar qualitative behavior $\Omega$ is the frequency detuning from resonance and $I_a$ is the saturation intensity, which for the saturable gain depends on the pumping power. For the gain or the absorption expressions, $\chi\mathbf{0}$ is replaced by positive or negative $\gamma\mathbf{0}$, respectively. The analysis of the Agrawal et al. reference is extended to multiple pairs of counter-propagating beams (denoted by $j=\pm1, \pm2, \ldots$) along the $\pm z$ axis in the cavity, having amplitudes $A_{\pm j}$, and find the coupled wave equations:

$$\frac{dA_{\pm j}}{dz} = \frac{\pm\gamma_0(1+i\Omega)}{(a^2-b^2)^{1/2}}\left(A_{\pm j} \mp \frac{a-(a^2-b^2)^{1/2}}{2}\ \frac{A_{\mp j}}{C_{\pm j}}\right), \tag{1}$$

where the minus and plus signs correspond to the right and left propagating beams, respectively, $$a = 1 + \Omega^2 + \sum_j (I_{+j} + I_{-j})/I_s,$$

$L_{\pm j}=A_{\pm j}A^*_{\pm j}$, $$C_{+j} = C^*_{-j} = \sum_{j'} A^*_{+j'}A_{-j'}e^{i\Phi_{jj'}}/I_s,$$

$\Phi_{jj'}=\Phi_{jj'}^{0}+2(k_k-k_{j'})z$, $k_j$ is wave-number, $\Phi_{jj'}^{0}$, is the relative phase at z=0 (that depends on the location of the saturable absorber medium in the cavity), and $b=2|C_{\pm j}|$. For mutually incoherent beams, where the gratings are eliminated, b=0.

From Eq. 1 the following conclusions are obtained:

1. When the counter-propagating beams are mutually incoherent, the second term in the equation vanishes, but the absolute value of the prefactor slightly decreases. In most of the interesting cases, however, coherence and coupling reduce the absorption or the gain.

2. The influence of one pair of mutually coherent counter-propagating beams (i.e. j=1) on another pair (j=2) (which may represent a signal beam and its reflection, or another mode in the laser), is given through b and $C_{\pm 2}$ in the equation for $A_{\pm 2}$ (equation 1). However, when the two pairs have different frequencies and the Bragg condition is not met, the effect in the second term in the equation with the factor $e^{i[\Phi_{21}0-2(k_2-k_1)z]}$ is cancelled in the integration due to the phase mismatch. Then, the prefactor $\gamma\mathbf{0}/(a^2-b^2)^{1/2}$ shows that the existence of grating induced by the first pair ($b\neq0$) raises the absorption or the gain for the signal or a second mode.

3. For a signal with a degenerate frequency (Bragg-matched), the relative phase $\Phi_{21}^{0}$ determines if the signal experiences lower ($\Phi_{21}^{0}=0$) or higher ($\Phi_{21}^{0}=180°$) absorption or gain. A simple understanding can also be obtained from the approximate coupled-wave equation by expanding $\chi(I)$ for $I_{\pm j}<<I_a$, similar to the way described in the paper by Fischer et al., Opt. Left 18, p. 2108 (1993), and Elect. Left. 29, p. 1858 (1993), where the role of the grating and the reflections are clearly seen.

For an analysis of the system in FIG. 1, the two coupled wave equations are separately solved for the two sections, the amplifier and the absorber, and the effective reflectivity for each part (the right and left sides in FIG. 1) with its attaches mirror is obtained.

Figure 2:
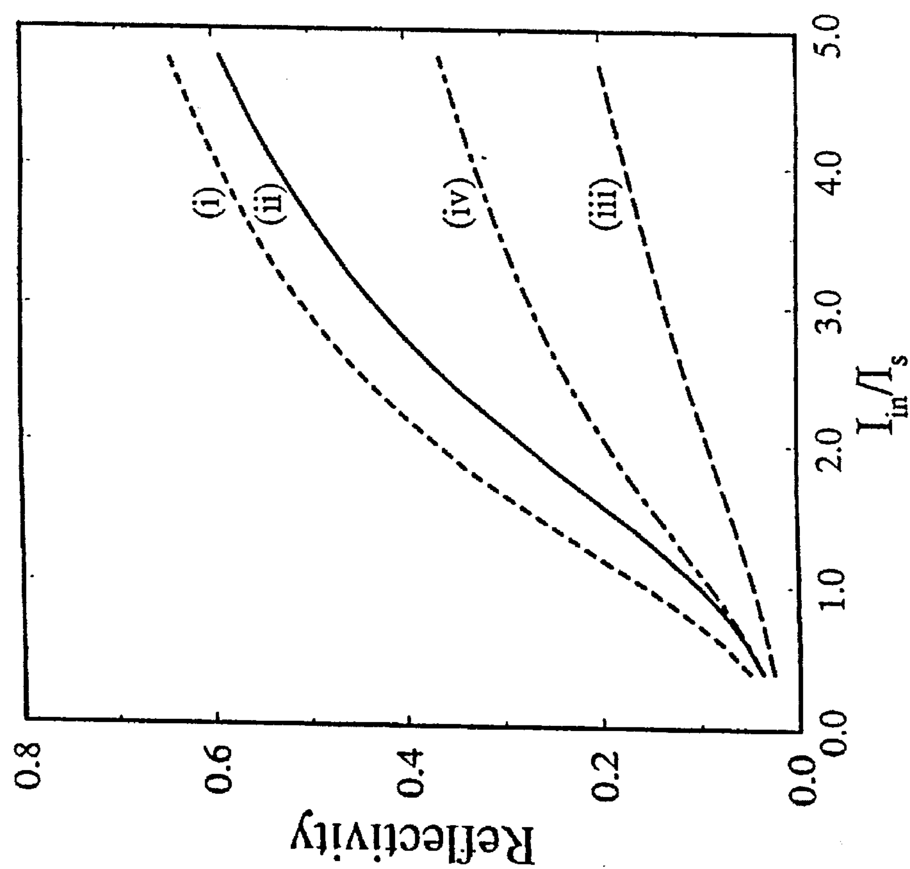
FIG. 2 is a graph showing the reflectivities of the mirror and saturable absorber in the laser cavity of FIG. 1, for various cases of beam coupling.

In FIG. 2, there are shown the reflectivities from the saturable absorber 14 with the mirror (the left half of FIG. 1) with $\gamma_0 l=-2$ and a mirror reflectivity of 95% for the various cases: (i) for one pair of counter-propagating beams with mutual coupling and interference and (ii) without coupling; (iii) for an extra signal beam, affected by the grating of the first pair, where the signal has the same frequency but is 180° out of phase, and (iv) for a signal out of the Bragg matching frequency. $I_{in}$ is the intensity of the input beam $I_1$ for (i) and (ii) and it is the added small intensity for (iii) and (iv).

Figure 3:
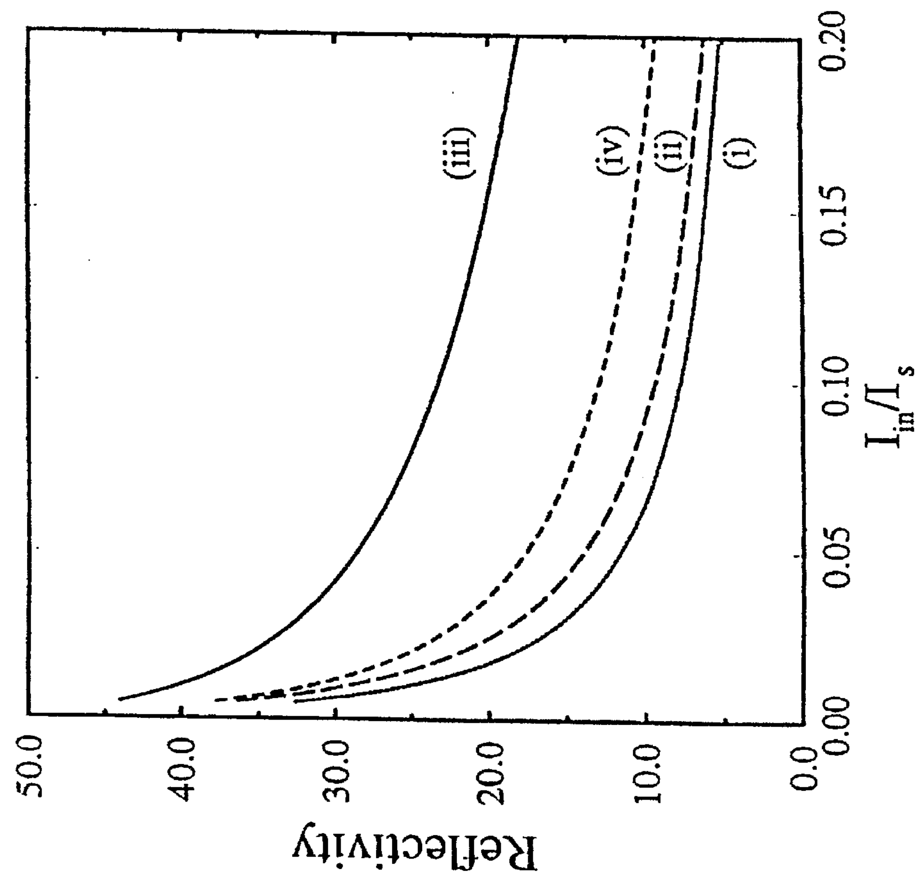
FIG. 3 is a graph showing the reflectivities of the mirror and saturable amplifier in the laser cavity of FIG. 1, for various cases of beam coupling.

In FIG. 3, there are shown the same reflectivities as in FIG. 2, for the saturable amplifier 16 with gain $\gamma_0 l=2$. (for the case where coupling exists in the gain section, the polarization rotators in FIG. 1 are removed).

The results in FIGS. 2 and 3 show some of the points discussed above: The difference between absorbing and gain media is seen; the mutual effect of a pair of beams with and without coupling is also seen as well as the effect of such a pair on another pair (small signal with its reflection or another mode) without and with Bragg matching for relative phases of $\Phi_{21}^{0}=0°$ (which is found to be equivalent to the one pair reflectivity) and $\Phi_{21}^{0}=180°$.

Now the oscillation power of the full laser system of FIG. 1 can be obtained. The two halves of FIG. 1 are matched (the input of one section is the output of the other and vice versa), use the reflectivities for the single interacting pair in the absorber part, with or without coupling and grating, and in the gain part, without coupling and grating. Then, the overall gain and losses are assumed equal and the oscillation intensity is obtained versus the gain.

Figure 4:
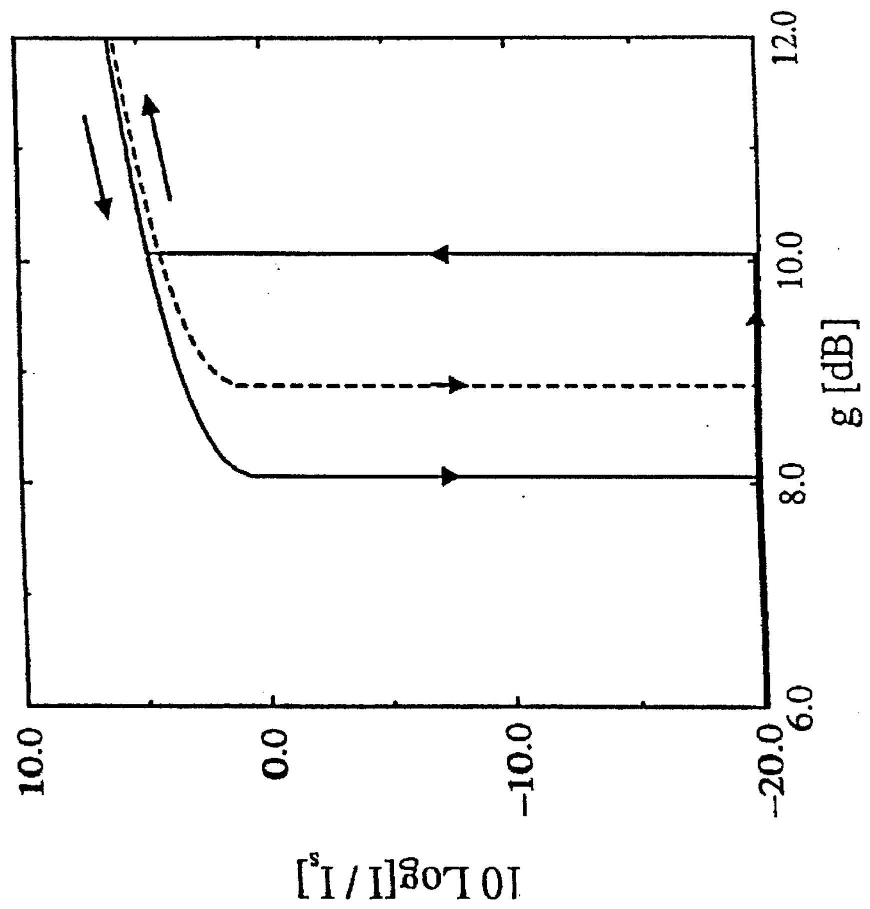
FIG. 4 is a graph of the theoretical output of the oscillation intensity versus gain for various beam coupling cases.

The result, with bistable behavior, is shown in FIG. 4, which presents the theoretical output of the oscillation intensity versus gain with (solid line) and without (dashed line) coupling of the counter-propagating beams in saturable absorber 14. The parameters used in the calculation were: $\gamma_0 l=-1.7$ for the saturable absorber 14, 95% mirror reflectivity, and other losses (mainly due to inter-fiber couplings) of 67% for one cavity roundtrip. Such behavior can also be obtained when the gain and the absorber are constructed as interleaved sections. This occurs, for example, by selective pumping or when the pumping is done with two counter-propagating beams which produce interference causing periodic gain and absorbing sections.

Figure 5:
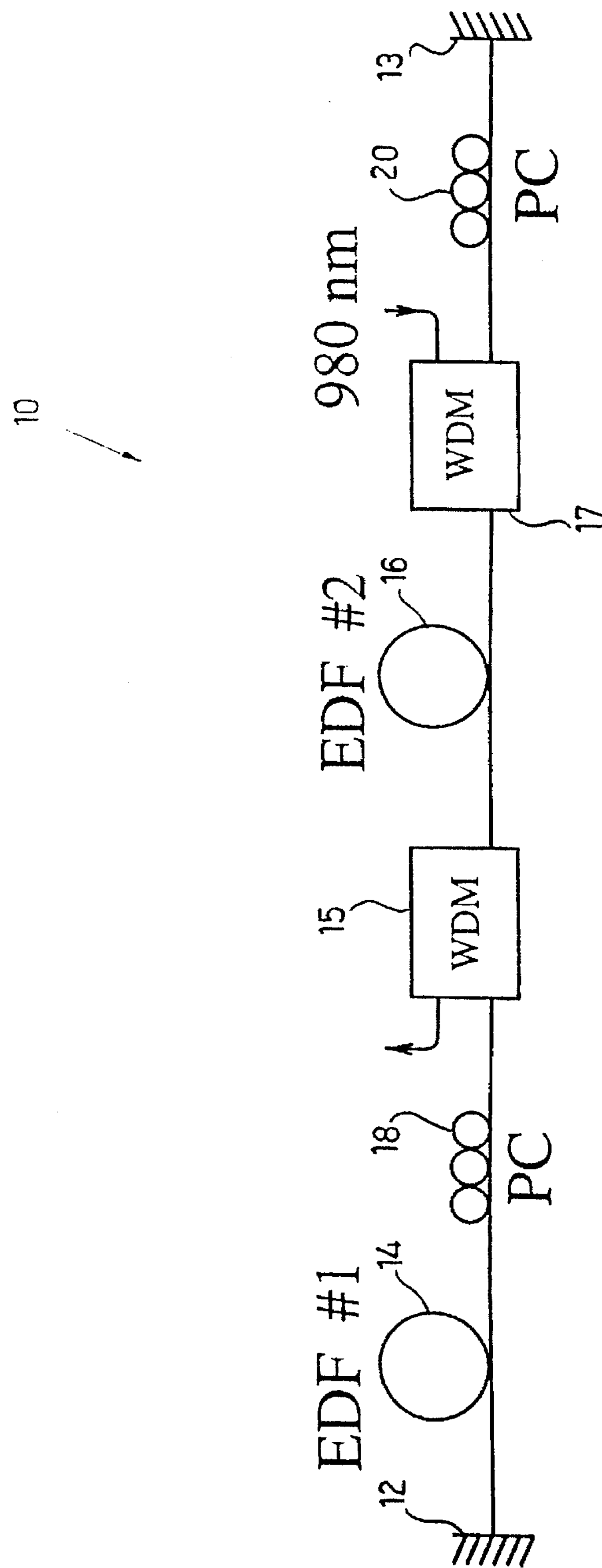
FIG. 5 is a schematic diagram of an erbium-doped fiber laser system, having a saturable absorber, saturable amplifier, and polarization controllers (PC)

An experimental setup for a laser system constructed in accordance with the method of the invention is shown in FIG. 5. Erbium-doped fibers were used as the amplifying media 16 and the saturable absorbing media 14. The gain section 16 was pumped by a 980 nm diode laser, which was injected by using a pair of wavelength division multiplexers (WDMs) 15, 17. The saturable absorber part 14 was unpumped. The fibers had a 2.5 μm alumino-germano-silicate core with a numerical aperture of 0.33 and an erbium concentration of 2500 ppm. The amplifier and absorber sections 16, 14 had lengths of 50 and 32 cm, respectively. The overall cavity length was 10.4 m. The mirrors 12, 13 reflectivity was about 95%.

Figure 6:
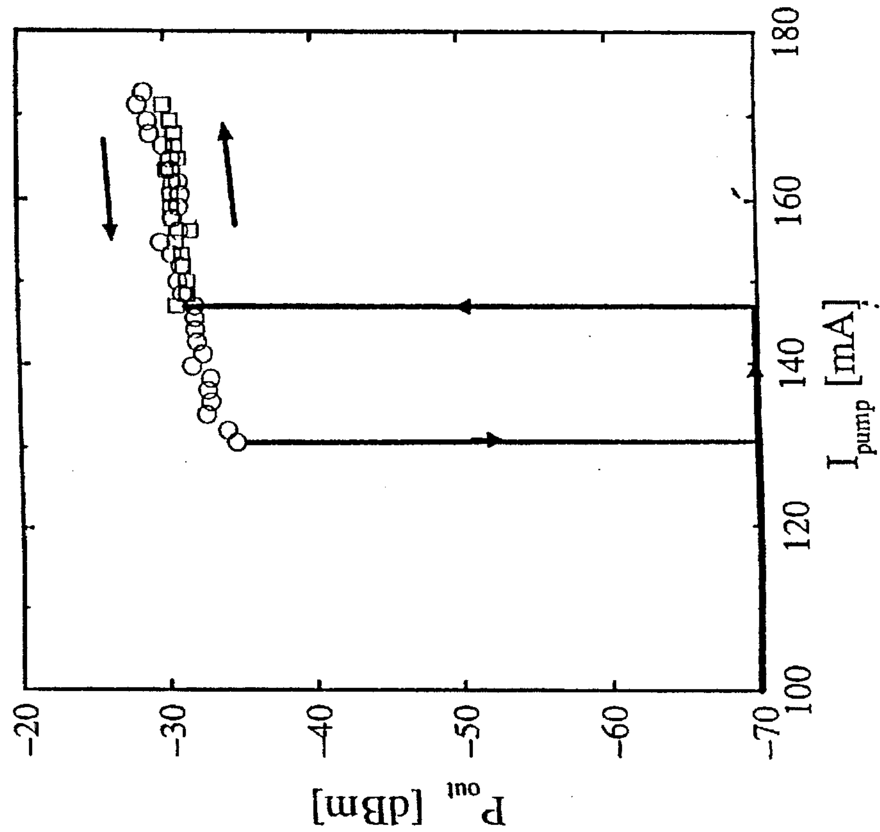
FIG. 6 is a graph of the experimental output of the oscillation intensity versus pumping power with a 980 nm laser.

In order to reduce the broadening effect in the gain section of the laser (see FIG. 1), the wave mixing was eliminated by making the polarizations of the counter-propagating beams in this section perpendicular, using polarization controllers 18, 20. The operation of the laser system with the saturable absorber section 14 in it showed bistable behavior of the oscillation intensity as a function of the pumping power, as shown in FIG. 6. The results are in accordance with the theory (FIG. 4). The switching was very sharp with an abrupt jump from "off" to "on" state and vice versa.

Figures 7A, 7B:
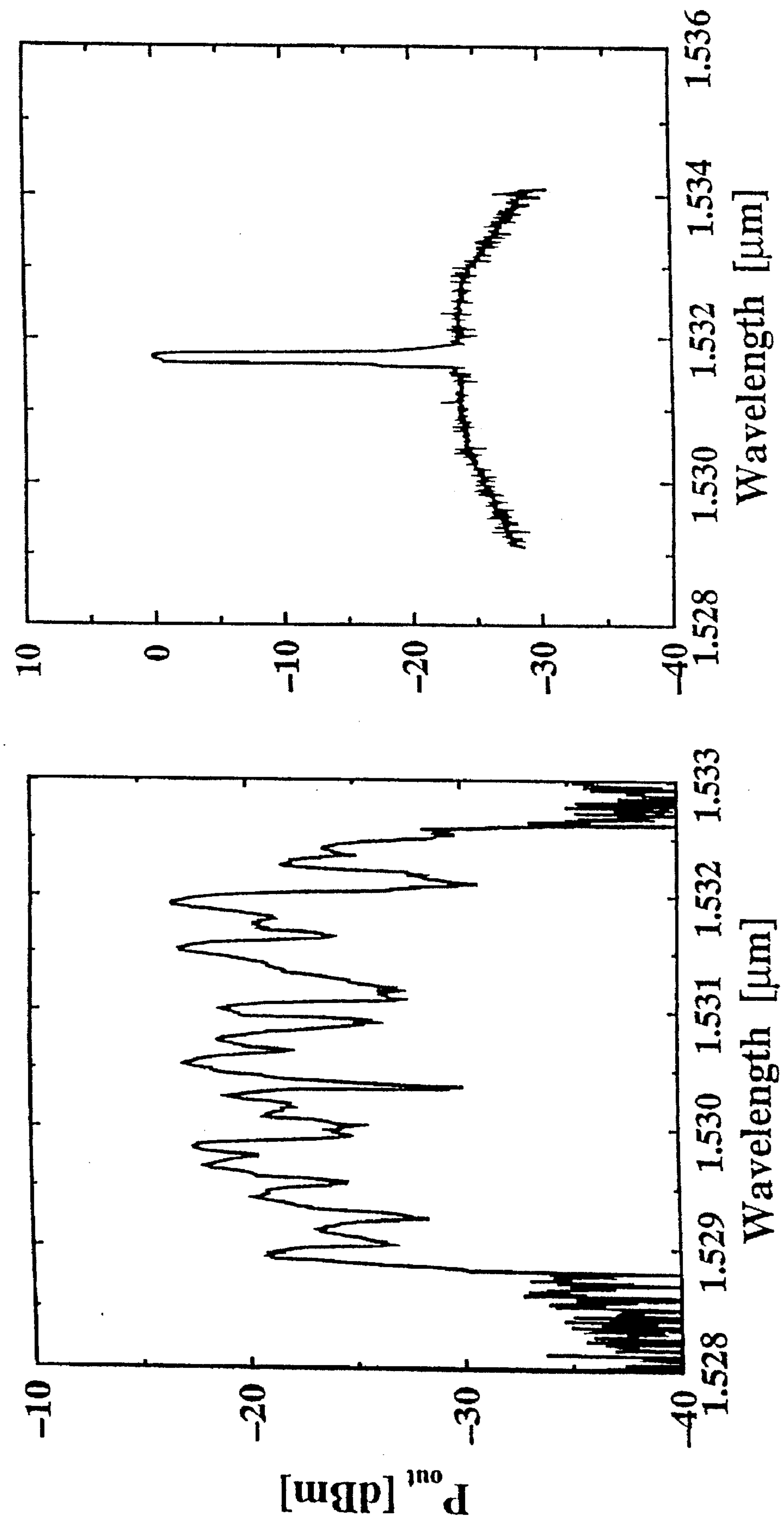
FIGS. 7*a–b* are graphs of the spectrum of the fiber laser system of FIG. 5, with and without the saturable absorber.

The spectrum of the fiber laser without the saturable absorber section 14 (replaced by a regular single mode fiber) is shown in FIG. 7*a*. The spectrum was very broad and erratic. In this case, the threshold pumping light power (of 980 nm) was about 10 mW. With the saturable absorber section 14, a much narrower linewidth was obtained (FIG. 7*b*). Here, the linewidth measurement is limited by the resolving power of the grating-based spectrum analyzer which was 0.1 nm. The spectrum was stable for periods of minutes. The specific wavelength, however, is not dictated by the filtering mechanism, unless another passive filter is inserted into the cavity. Nevertheless, once the laser starts to operate at a specific line, it will tend to stick to it. The threshold pumping light power (of 980 nm) in this configuration was 50 mW.

In order to verify single mode operation and to evaluate the linewidth more carefully, a Fabry-Perot etalon and an RF spectrum analyzer were also used, as well as delayed self-homodyning (Mach-Zehnder interferometer).

Figure 8:
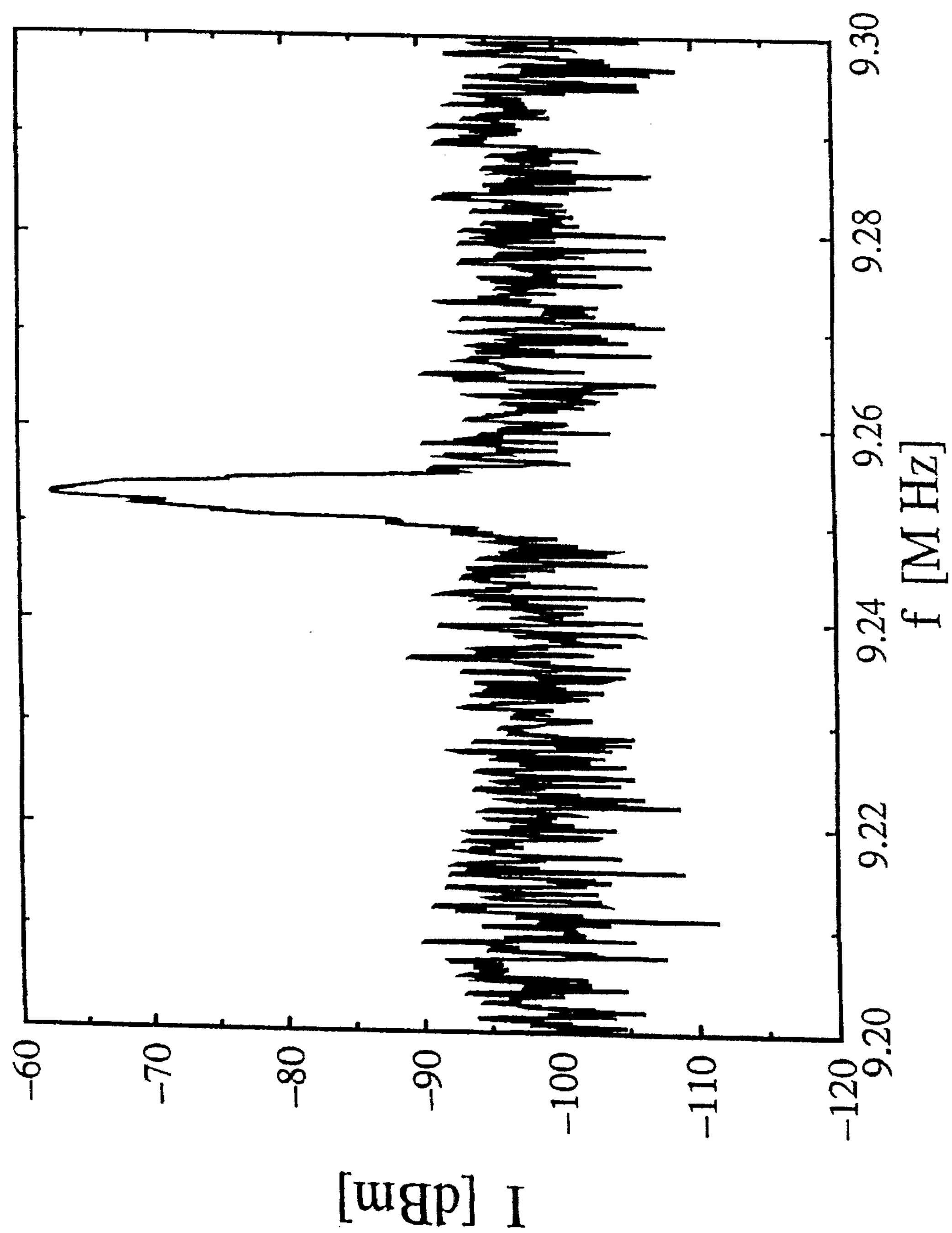
FIG. 8 is a graph of the RF spectrum of the output detected light produced by the laser system of FIG. 5.

FIG. 8 shows the RF spectrum of the output detected light, observed at instances when two longitudinal modes existed. From the RF spectra it was observed that for most of the time (90%) the laser oscillated in a single longitudinal mode. In this case (not shown in FIG. 8), the RF spectrum did not exhibit a peak corresponding to the beating between adjacent cavity modes. From time to time the laser did build up a second mode, as indicated by the momentary presence of the peak at 9.25 MHz (FIG. 8). The width of this peak was below 5 kHz.

Figure 9:
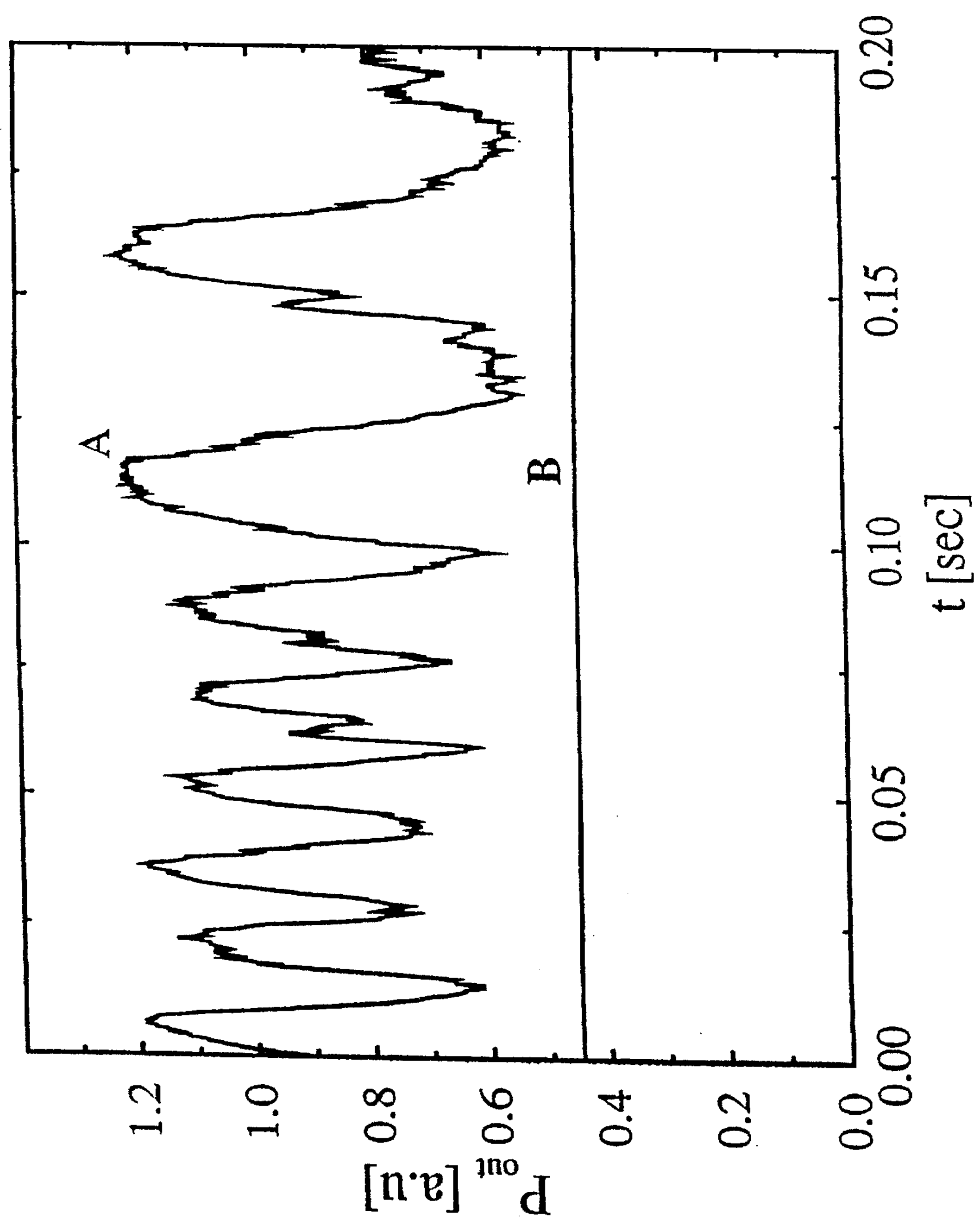
FIG. 9 is a graph showing the time dependence of the output of a Mach-Zehnder interferometer in a delayed self-homodyning experiment.

The Mach-Zehnder interferometer, which provides a delayed self-homodyning experiment, showed a strong interference between the two split arms having a mutual delay of 7.5 km (corresponding to an upper limit of 20 kHz for the linewidth). In FIG. 9, curve A shows the time dependence of the interference, which is evident in the strong fluctuations seen in the time domain, that are related to the final changes of the refractive index in the long fibers. Curve B in the figure is the output intensity of the interferometer when one branch was blocked.

The single mode operation is a result of the nonlinear wave mixing and the induced grating which enhance the coherence and eliminate other modes, as explained above. A first estimate of the filtering effect can be obtained by considering a simple passive grating. Note that the possibility of self-induced distributed grating in long fibers in the cavity is by itself an advantage, which is difficult to achieve in other ways.

For such a passive grating with length l (of 32 cm), the filtering width is given by $^{\delta\nu}$grating≈c/(2nl)≈312 MHz. This is larger, than the longitudinal mode spacing Δν=c/(2nL) ≈9.25 MHz, where now L (≈10.4 m) is the laser cavity length. Note however, that the active parts in the cavity in the experiment had a length of only 0.82 m; therefore the overall length could have been shortened to make the mode spacing comparable to the frequency width of the passive grating. Adding to this filtering effect the mechanism of the nonlinear wave mixing described earlier, causes the strong tendency to a single mode oscillation.

The theoretical linewidth-limit of a single mode laser can be very narrow due to the long cavity. According to the Schawlow-Townes formula with values of 95% mirrors reflectivity, cavity length of 10 m, one roundtrip absorption of 50% and power of 0.1 nW, the oretical limit can reach $10^{-1}$ to $10^{-2}$ Hz. Therefore, a linewidth in the kHz regime is not surprising, and it is expected that by proper thermal and acoustical stabilization, as well as optimization of the lengths of the fibers, it will be possible to reduce the linewidth and insure the robustness of single mode operation.

In summary, the method of the present invention provides a linewidth narrowing mechanism in lasers that uses the intra-cavity nonlinear absorptive wave-mixing. The passive nature of the self-induced grating distributed in the cavity can provide a unique way for obtaining single wavelength operation, especially of long fiber lasers.

Having described the invention with regard to certain specific embodiments and methods, it is to be understood that the description is not meant as a limitation since further modifications may now suggest themselves to those skilled in the art, and it is intended to cover such modifications as fall within the scope of the appended claims.

We claim:

1. A method for single frequency non-mode locked, continuous operation and linewidth narrowing of a laser, said method comprising the steps of:

providing a laser cavity defining a round trip time, said cavity having a gain medium, and a distributed saturable absorber, said absorber having a response time greater than said cavity round trip time, said absorber having a length several orders of magnitude greater than a laser wavelength corresponding to the single frequency; and pumping said gain medium to provide oscillation of at least one pair of counterpropagating light beams in said saturable absorber, said counterpropagating light beams interfering with each other in said saturable absorber, said interference in said saturable absorber developing nonlinear wave-mixing of said at least one pair of counter-propagating light beams and producing the single frequency non-mode locked operation and linewidth narrowing of the laser.

2. The method of claim 1 wherein said gain medium and said distributed saturable absorber are interleaved within said cavity.

3. The method of claim 1 wherein said gain medium is a non-distributed type which minimizes wave-mixing of said at least one pair of counterpropagating light beams in said gain medium.

4. The method of claim 1 wherein an input power level of said pumping step is varied cyclically within a predetermined range, thus controlling the power of said oscillation to provide bistable behavior of said oscillation power as a function of said input power level.

5. The method of claim 1 wherein during said pumping step, said non-linear wave mixing in said saturable absorber stabilizes at least one of the power of said oscillation, and its frequency.

6. The method of claim 1 wherein said gain medium is of a semiconductor type which minimizes wave-mixing of said at least one pair of counterpropagating light beams in said gain medium.

7. The method of claim 1 further comprising the step of controlling the polarizations of said at least one pair of counter-propagating light beams by use of a pair of Faraday rotator-type of polarization controllers each disposed in said cavity proximate an end of said gain medium, to maximize orthogonal polarization of said beam pair in said gain medium while simultaneously maximizing parallelism of said beam pair in said saturable absorber.

8. The method of claim 1 further comprising the step of controlling the polarizations of said at least one pair of counter-propagating light beams by use of a pair of retardation plate-type of polarization controllers each disposed in said cavity proximate an end of said gain medium, to maximize orthogonal polarization of said beam pair in said gain medium while simultaneously maximizing parallelism of said beam pair in said saturable absorber.

9. An apparatus for single frequency non-mode locked, continuous operation and linewidth narrowing of a laser, said apparatus comprising:

a laser cavity defining a round trip time, said cavity having a gain medium, and a distributed saturable absorber, said absorber having a response time greater than said cavity round trip time, said absorber having a length several orders of magnitude greater than a laser wavelength corresponding to the single frequency, wherein said gain medium Is pumped to provide oscillation of at least one pair of counterpropagating light beams in said saturable absorber, said counterpropagating light beams interfering with each other in said saturable absorber, said interference in said saturable absorber developing nonlinear wave-mixing of said at least one pair of counter-propagating light beams and producing the single frequency non-mode locked operation and linewidth narrowing of the laser.

10. The apparatus of claim 9 wherein said gain medium and said distributed saturable absorber are interleaved within said cavity.

11. The apparatus of claim 9 wherein at least one of said gain medium and saturable absorber is an optical fiber.

12. The apparatus of claim 11 wherein said fiber is an erbium-doped fiber.

13. The apparatus of claim 9 further comprising a pair of Faraday rotator-type of polarization controllers each disposed in said cavity proximate an end of said gain medium, for controlling the polarizations of said at least one pair of counter-propagating light beams to maximize orthogonal polarization of said beam pair in said gain medium while simultaneously maximizing parallelism of said beam pair in said saturable absorber.

14. The apparatus of claim 9 further comprising a pair of retardation plate-type of polarization controllers each disposed in said cavity proximate an end of said gain medium, for controlling the polarizations of said at least one pair of counter-propagating light beams to maximize orthogonal polarization of said beam pair in said gain medium while simultaneously maximizing parallelism of said beam pair in said saturable absorber.

15. The apparatus of claim 9 wherein said saturable absorber has a refractive index which changes in a non-linear fashion as a result of said interference of said at least one pair of counterpropagating light beams, said changes in said refractive index partially causing said wave mixing.

* * * * *